United States Patent [19]
Kubisiak

[11] 3,710,128
[45] Jan. 9, 1973

[54] METHOD AND DEVICE FOR PHOTOELECTRICALLY SCANNING AN OBJECT BY MEANS OF AN OPTICAL BEAM

[75] Inventor: Helmut Kubisiak, Leverkusen, Germany

[73] Assignee: Exatest Messtechnik GmbH, Leverkusen, Germany

[22] Filed: Nov. 25, 1970

[21] Appl. No.: 92,656

[30] Foreign Application Priority Data

April 2, 1970 Germany.....................P 20 15 694.9

[52] U.S. Cl.......250/219 WD, 250/219 LG, 250/235
[51] Int. Cl..............................................G01n 21/30
[58] Field of Search ..250/219 QA, 219 FR, 219 WE, 250/219 WD, 219 LG, 222, 223, 237, 235, 236, 220; 356/157, 158

[56] References Cited

UNITED STATES PATENTS

| | | | |
|---|---|---|---|
| 2,919,624 | 1/1960 | Lindemann | 250/219 DF |
| 3,448,278 | 6/1969 | O'Brien | 250/236 |
| 2,791,931 | 5/1957 | Summerhayes | 250/219 WD |
| 3,486,828 | 12/1969 | Nickell | 250/219 WD |
| 3,441,739 | 4/1969 | Clark | 250/236 |

Primary Examiner—Archie R. Borchelt
Assistant Examiner—D. C. Nelms
Attorney—William R. Sherman, Stewart F. Moore and Jerry M. Presson

[57] ABSTRACT

This method is used for determining the position of width of an object, for example a wire or a metal strip. The object, which may either be glowing or else be illuminated from its backside, is scanned by an optical beam. As the beam crosses the edges of the object there is a jump in the illumination level; this is detected by a photoelectric detector. The illumination jump is not sharply defined; but it is known that the point at which the illumination level is just half of its maximum value corresponds to the instant at which the beam crosses the edge. This half-value point is difficult to detect in the case of the non-illumination to illumination transition, for at the time the illumination is passing through the half-value, it is not yet known what the full value is going to be. This invention palliates that disadvantage by prescanning the object by means of an auxiliary optical beam just before the scanning of the object by the main optical beam; the maximum value of the illumination as determined by this prescanning is then used as the reference. An output signal is generated by a coincidence detector at the instant when the value of the illumination of the main scanning beam just equals half the maximum value determined by the prescanning.

18 Claims, 4 Drawing Figures

METHOD AND DEVICE FOR PHOTOELECTRICALLY SCANNING AN OBJECT BY MEANS OF AN OPTICAL BEAM

The invention concerns a method for photoelectrically scanning an object by means of an optical beam.

The term "optical beam" is used to indicate that a photoelectric detector is provided with a diaphragm and/or lens system in front thereof, the aperture of the latter being extremely small; for the purpose of the scanning, the lightflux confined by said aperture and designated as the "optical beam" is moved once or periodically over the object to be scanned.

The object may be self-radiating—for example a glowing wire—or may be illuminated from its back side. The diaphragm lens system is focussed in such a manner that a focussed image of the object edges will appear on the detector. The periodical scanning is usually done by means of a rotating polygonal mirror which determines the radiation path. Such methods are used to detect the geometric dimensions or the position of the scanned object; the time interval between two illumination "jumps" (abrupt changes in level) occurring at the edges, or the time interval between one such illumination jump and a reference pulse defining a reference edge, is used as the measurement signal.

The more accurately such a measurement is to be made, the more accurately the illumination jump must be detected. Further study shows that the illumination "jump" has by no means the form of a step, but that on the contrary at the output of the photoelectric detector a transition function will appear. There are substantially three reasons for this:

First, the optical beam cannot be made infinitely small because otherwise the measurement pulse would disappear in the noise level. Thus, a minimum duration of the transition function is given. Second, the focussing cannot be maintained in any case because the object distance may vary. Third, at the object edges there are no sharp illumination/non-illumination or non-illumination/illumination steps, due to diffraction effects in the shadow method and due to heating of the surrounding airlayers for the infrared method.

It is known that in such a transition function regardless of the cited error sources the edge may be reproducably defined even under varying conditions by that instant of the transition function at which the output signal of the detector has just half the amplitude of that signal which will be delivered under full illumination. (It is a matter of course that a linear dependence of the detector output signal upon the impinging lightflux is assumed).

This teaching has already been used. When the transition from illumination to non-illumination is to be detected the amplitude of the detector output signal may for example be held by means of a so-called "sample-hold-circuit," and its half level may be detected be means of, say, a capacitive voltage divider. As soon as the detector output signal crosses that level the jump signal will be delivered at that instant.

This method, however, cannot be used when the transition from non-illumination to illumination is to be processed, because in this case the reference amplitude of full illumination is not yet known. Therefore, when the above described method was to be used for, say, measuring the width of a strip or the diameter of a wire, necessarily the illumination had to be assumed as constant, and for the second transition from non-illumination to illumination the half amplitude as detected by the first transition from illumination to non-illumination had to be used as the reference level; this, however, was only possible for the shadow method.

The assumption of a constant illumination, however, is incorrect in most cases so that measurements executed according to the described method have a considerable error.

If the illumination to non-illumination as well as the non-illumination to illumination transition is to be processed, therefore, in most cases that instant of the transition function will be used at which just a noticeable deviation from the preceding amplitude level occurs. This measurement will as explained above not be correct because the duration of the transition function may vary (while, as explained above, the instant of the half amplitude remains constant) and because just in this portion of the transition function the amplitude increase is rather slow; since the response threshold of the following circuits, however, must be above the noise level, excessive errors will be introduced. As an example it has been observed that with the known methods the width of an object about 2 m wide can be detected with an accuracy not better than ±1 cm.

It is the object of the present invention to provide a method for photoelectrically scanning an object by means of an optical beam to detect the transition from non-illumination to an illumination of unknown level, thereby generating a scanning signal whose amplitude is proportional to the instantaneous illumination, and to deliver a jump signal at a certain instant of the transition interval, which method permits the detection of said instant with a substantially better accuracy than the method hitherto used. The purpose is to achieve a substantially more accurate measurement of the width or position of the object. The "certain" instant will preferably be the instant at which the scanning signal has half the amplitude with respect to the level which it will achieve at full illumination; in the latter case the measurement will be the most accurate. By means of the method according to the invention, however, a substantially better detection can also be obtained of, say, the beginning of the transition function.

This problem will be solved in accordance with the invention by effecting a pre-scanning by means of a second optical beam which precedes the scanning optical beam to generate an auxiliary signal of amplitude corresponding to full illumination, and by determining the instant of the jump signal delivery by coincidence of the scanning signal amplitude with a certain fraction or multiple of the held auxiliary signal amplitude.

According to the invention it is no longer necessary to process—starting from a non-illumination level—a first amplitude deviation which exceeds a certain threshold value, but it is possible to detect very accurately the instant of the half amplitude since the entire or full amplitude will be pre-detected. Moreover, the response threshold for the circuit following the detector may be chosen very sensitive (which is not the case with the methods used hitherto) because the transition will be processed preferably in the very steep area where the noise superimposed on the scanning signal will only be able to create a relatively small error as far as the time measurement is concerned.

The most accurate measurements will thus result if, as explained above, the instant of the jump signal delivery is determined by coincidence of the scanning signal amplitude with one half of the auxiliary signal amplitude or by coincidence of twice the scanning signal amplitude with the auxiliary signal amplitude. Depending upon the technically simpler solution, one may provide an amplitude division or amplitude multiplication.

It may be added that depending upon the choice of the "certain" instant of the transition interval either the instant of coincidence or the instant at which the coincidence ceases will determine the delivery of the jump signal; this will be explained in more detail hereunder.

It is surprisingly possible to execute the method according to the invention with only a slightly modified prior art device hitherto used for the known methods.

A device for executing the method according to the invention comprises a photoelectric detector and a diaphragm system in front thereof; it is characterized in that the diaphragm system comprises an auxiliary diaphragm aperture and a scanning diaphragm aperture for passing in time shifted succession one optical beam each to the detector.

It will be acknowledged that but a further diaphragm aperture is necessary in comparison with the state of the art while for the circuitry for the processing of the generated detector output signals certain additional means must be provided as will be explained in detail later.

Suitably slot shaped diaphragm apertures will be provided and made as equal as possible. Possible deviations from equality may be easily compensated by a unique calibration.

Since the illumination level and thus the auxiliary signal amplitude which serves as a reference level may be subjected to variations with time, one will take care to make the auxiliary optical beam and the scanning optical beam follow with a time space as small as possible. This may lead to difficulties if the time spacing between a non-illumination/illumination transition and the following retransition from illumination to non-illumination is shorter than the time spacing between auxiliary and scanning signal. In accordance with the invention in such a case it is provided that the spacing of the two diaphragm apertures is chosen in such a manner that at the output of the detector the scanning and the auxiliary signal are superimposed thereby generating an amplitude step in the detector output signal corresponding to the full auxiliary signal amplitude and that the detector is followed by circuitry for delivering said jump signal in the instant of the beginning or the termination of coincidence between said amplitude step—multiplied by a first constant factor—and the detector output signal amplitude - multiplied by a second constant factor.

It will be understood that in the case just described there will not occur two properly spaced output pulses at the detector output but a superposition of both of them. At the critical instant, i.e., at the non-illumination/illumination transition, the scanning signal per se may not be detectable but only the sum of the amplitudes of the auxiliary and the scanning signal. In order to permit proper processing in accordance with the invention certain factors or coefficients must be introduced which, however, remain constant and will not introduce any technical problem. These coefficients, however, will play a certain role as soon as the device according to the invention is used for measuring the width, because these factors will have different values in the superposition depending upon whether the transition is going from non-illumination to illumination or vice versa. It is a matter of course for anybody skilled in the art that in the latter case a switch must be provided for the signals at the output of the circuit device so as to subject the signals alternately to one or the other factor which may even be smaller than unity.

For the case of the superposition of the auxiliary and scanning signals the circuitry of the device may comprise an amplitude holding circuit for holding the amplitude step, said holding circuit being controlled by a release circuit effecting the operation of the holding circuit at a certain time interval after the beginning of the amplitude step. The "held" amplitude and the instantaneous amplitude, one or even both of which may be multiplied by a coefficient which in turn may be greater or smaller than unity, will then each be supplied to one input of a coincidence detector which delivers the desired jump signal in the instants of the amplitude coincidence. For the purpose of the coefficient introduction adjustable attenuators or amplifiers will simply be used.

The invention will be explained in detail hereunder by way of example with reference to the accompanying drawings.

Figure 1:
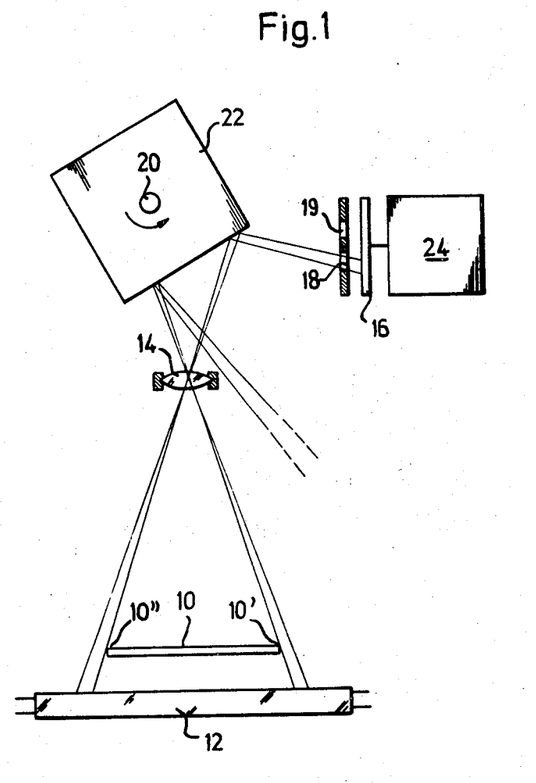
FIG. 1 shows schematically a device for measuring the width of an object in accordance with the method of the invention.
Figure 2:
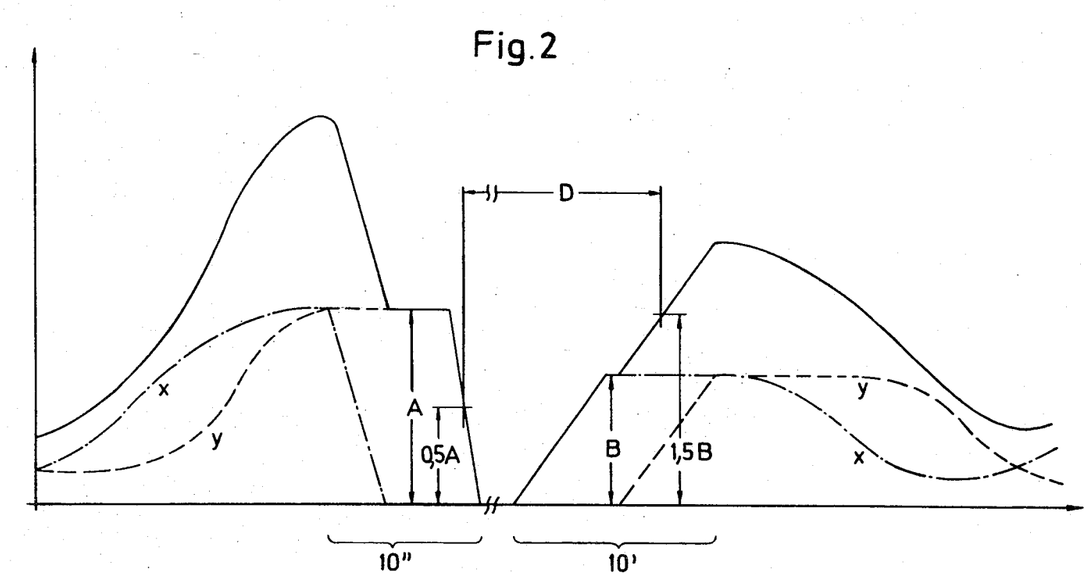
FIG. 2 shows schematically the signal amplitude at the detector output of FIG. 1 plotted over the time.

Referring to FIG. 1 an object 10—for example a sheet metal strip—is illuminated from its back side by means of a lightsource 12. The image of the plane defined by edges 10', 10'' of the object is focussed by means of a lens system 14 into the plane of a photoelectric detector 16; the image is periodically produced, for which purpose the beampath is deflected by means of a polygonal mirror 22 rotating about axis 20 so that the image is periodically passed over detector 16. In front of the detector two diaphragm apertures 18, 19 are disposed which successively pass the optical beams defined thereby. The device is similar to the commonly used constructions except for the double diaphragm aperture provision. The voltage at the detector output is supplied to circuitry 24. The voltages X, Y are shown in dashed lines in FIG. 2 plotted over the time, said voltages being generated at the output of detector 16 by means of the optical beams impinging on the detector via diaphragm apertures 18 and 19. These voltages cannot be measured separately but at the detector output the superposition thereof will appear as shown in FIG. 2 in solid lines, this superposition resulting from summing voltages X and Y. Steps will be produced in the amplitude curves; the first one (step A) during the period when only the scanning signal Y is effective, and the second one (step B) when only the auxiliary signal X is effective. It will further be observed that due to a non-uniform illumination distribution which may have various reasons the amplitudes prior to and after the scanning of the object will have different levels; in the period therebetween the object entirely shadows the detector. The amplitude levels of steps A and B are correspondingly different. Finally it will be observed that for reasons which are not pertinent in view of the invention, the duration of the transition at edge 10' is longer than at edge 10'' of the object. The accurate measurement for the distance between edges 10', 10'' is given by the duration D defined by the time interval between that point of the voltage curve Y (scanning amplitude) at which the voltage has decreased to half the value of step amplitude A and that point of the same voltage curve at which again half the amplitude of step B is achieved. Evidently in the transition from illumination to non-illumination comprising step A the voltage Y may be measured since the diaphragm aperture 18 has already been entirely shadowed, but in this case no auxiliary signal would be necessary in any way because the "full" amplitude could be measured.

The situation is entirely different in the transition from non-illumination to illumination. Here superposition appears at the output of detector 16 and the measurement point at which the jump signal should be delivered has the amplitude of step B multiplied by 1.5, namely the full amplitude plus the half amplitude of step B.

The circuitry, thus, is to be designed in such a manner that for the first transition the amplitude A is stored or held and the stored value is reduced in the ratio 2:1 and thereafter fed to the input of the coincidence detector whose other input is fed with the output signal of the photoelectric detector 16. In the instant of coincidence the coincidence detector delivers the jump signal corresponding to edge 10''. At the second transition the amplitude of step B is stored or held and supplied to one input of a coincidence detector whose other input is supplied with the output signal of the photoelectric detector reduced in the ratio 3:2. In the instant of coincidence the second jump signal will be delivered corresponding to edge 10'.

It is within the scope of the invention to generate the jump signal in that instant when the amplitude of the detector output signal begins to deviate from step A or B respectively, thus upon termination of the coincidence between auxiliary and scanning signal. Admittedly in this case the "half amplitude of full illumination" will not be accurately measured but nevertheless an improvement over the method as hitherto used and described above will be obtained in that not only the rising or falling pulse edge will be differentiated but the jump signal will be derived by the coincidence circuitry. Particularly in case of small edge steepness an improvement in the accuracy is obtained of about half an order of magnitude; it may be added that the error will be reduced to about ±0.1 mm at a width to be measured if 2 m if the half amplitude itself is processed.

The optical design of the device according to the invention permits the application of both measuring methods; the embodiment of the circuitry as described hereinunder is one which permits the most accurate measurement.

Figure 3:
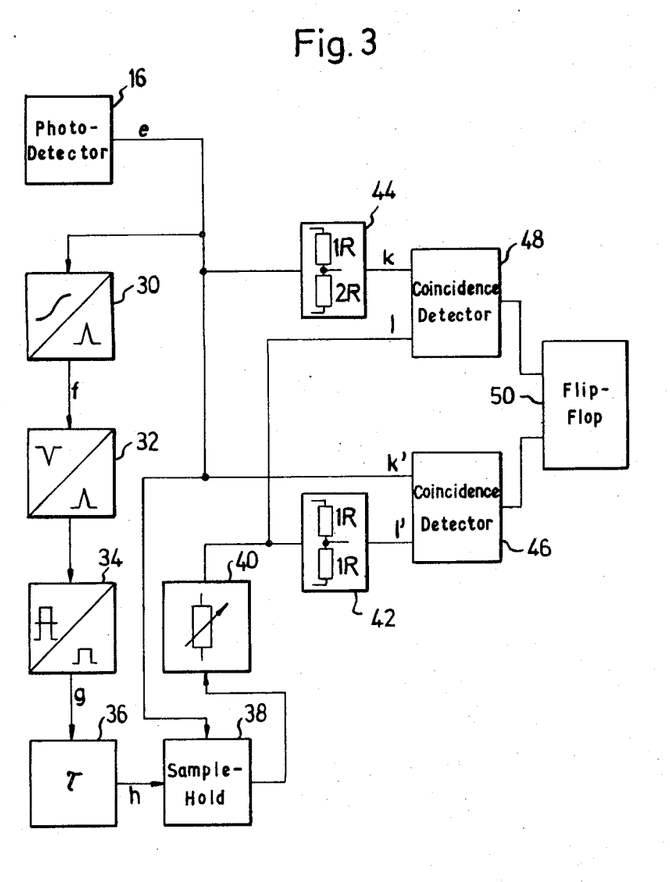
FIG. 3 shows the block diagram of the circuitry connected to the device shown in FIG. 1.

FIG. 3 will be discussed in connection with FIG. 4. The output signal E of the photoelectric detector 16 is differentiated by means of a differentiating stage 30 (diagram F). The differentiating stage 30 is followed by an inverter 32 which inverts the negative signals but lets pass the positive ones and by a threshold circuit 34 which passes only the sharp needle pulses at the illumination jumps (signal G). Signals G control a delay circuit 36 which delivers after a predetermined delay a control pulse H. The delay circuit 36 introduces a time delay corresponding to about half the time shift between the auxiliary and the scanning optical beams and thus terminates about in the center of steps A and B respectively. In this very instant a so-called "sample-hold-circuit" 38 is triggered by pulse H and switched to the "hold" state. The sample-hold-circuit is readily available on the market and has the feature that in its state "sample" the voltage fed in at its input is passed undisturbed to its output while in the instant of switching to the hold state the input voltage is stored or held and passed constantly to the output until the circuit is reswitched to the sample state.

At the input of the sample-hold-circuit 38 the detector output signal E is supplied; at its output, however, the signal E will appear only as long as no signal H is present. During the duration of signal H, on the contrary, at the output of the sample-hold-circuit 38 the amplitude of step A or B is present, and that alternately. The output signal of the sample-hold-circuit is fed via an amplifier 40 whose gain is about equal to unity but may be adjusted in both directions by a certain amount in order to eliminate possible non-uniformities of the diaphragm openings 18 and 19 by a calibrating process.

The photodetector output signal E is supplied to one input k' of a coincidence detector 46 whose other input l' receives the amplified output signal of the sample-hold-circuit 38 after it has been multiplied by one-half in a multiplier circuit 42. The photodetector output E is also fed, after multiplication by two-thirds in another multiplier circuit 44, to one input k of a second coincidence detector 48, whose other input l receives the amplified output signal direct from the amplifier 40. The coincidence detector 46 delivers an output signal M when the amplitude of the photodetector output signal E equals one-half of the stored amplitude of the step A; and the coincidence detector 48 delivers an output signal M when two-thirds of the amplitude of the photodetector output signal E equals the stored amplitude of the step B.

The output pulses M from the two coincidence detectors 46, 48 control a bistable multivibrator 50 which produces an output pulse of duration D equal to the time interval between the pulse delivered by the detector 46 and the pulse delivered by the detector 48.

One may readily see from the characteristic of signals K', L' (FIG. 4) that exactly at the desired instant, due to the amplitude equality which then will be present at both inputs of the coincidence detector 46, an output signal will be generated by this coincidence detector. In this first portion of the amplitude characteristic, for the sake of simplicity the curve of signals K, L is not drawn, but one will appreciate readily that until the sample-hold-circuit 38 switches to the hold state, certainly no coincidence will occur, since the signal K has always but two-thirds of the signal L amplitude, and after switching over of the sample-hold-circuit 38 to hold there will be no coincidence whatsoever because then signal K will decrease further while signal L will remain at its held amplitude value. Thus coincidence detector 48 will be energized when the first portion of the signal E is scanned.

Similar conditions are applicable to coincidence detector 46 which remains out of service during the second portion (increasing illumination). However, at one input of the coincidence detector 48, signal E will appear as signal K after attenuation to two-thirds of its amplitude; signal L at the output of amplifier 40 will go in parallel to the signal K until the sample-hold-circuit is switched to its hold state about in the center of the step B. Thus at the input $l$ of coincidence detector 48 during the delay pulse H the amplitude of step B will appear, and the coincidence detector 48 will deliver an output signal in that instant in which the increasing voltage at input $k$ crosses the signal appearing at input $l$. From the given data one will readily derive that this coincidence signal will again appear at the proper instant. Similarly, from FIG. 4 it can be derived that upon termination of the delay pulse H the signal L will jump to the full value of signal E since the sample-hold-circuit will then again operate in its sample mode. It may be mentioned for the sake of completeness that during the transmission from non-illumination to illumination the coincidence detector 46 will receive at the input $k'$ the full amplitude E while at its input $l'$ *the amplitude of signal E appears with only one half of its amplitude*.

Thus a crossing of the two curves is evidently impossible so that coincidence detector 46 will not be excited in this case. A malfunction could appear only if the delay pulse H had an exceedingly long duration so that the sample-hold-circuit 38 is still in its hold state when the signal L is already decreasing. However, it is evident that the pulse duration H is quite uncritical and may be chosen between three and five times the duration of steps A or B.

Of course, in lieu of the voltage dividers 42, 44 of which voltage divider 42 provides a 2:1 division and voltage divider 44 provides a 3:2 division, voltage amplifiers could be provided having a gain of 2 in the $k'$-input and of 1.5 in the $l$-input. The operation, of course, remains the same.

It should be pointed out that the method according to the invention is of importance in particular for the transition comprising the step B; the step A is of less importance but is introduced anyway due to the existence of the two diaphragm openings 18, 19. For the illumination/non-illumination transition the sample-hold-circuit could otherwise be directly controlled by amplitude E coincidence with the 2:3 divided full amplitude to be processed.

It is a matter of course that all standard elements, as amplifiers, pulse former stages and the like are not shown in the block circuit diagram of FIG. 3 since their use is very well known.

Figure 4:
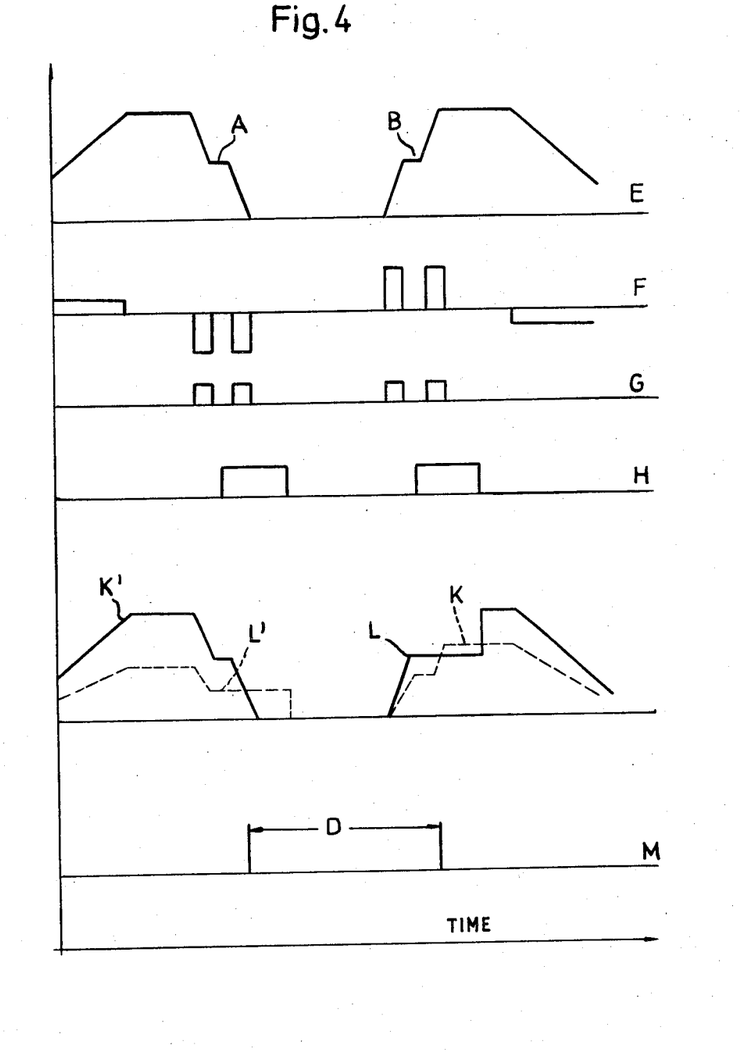
FIG. 4 is a diagram of the voltages at different points of the circuitry of FIG. 3 plotted over the time, voltages designated with capital letters appearing at points in the circuitry designated with the respective small letters.

In FIGS. 2 and 4 the amplitude characteristics are not shown in the proper scale; the time axis is partly extended while being shortened between the two transitions shown.

The amendments necessary in the circuitry to detect those instants at which the further amplitude decrease from step A and the further amplitude increase from step B, respectively, will occur do not involve any problem so that a detailed explanation is not necessary.

I claim:

1. A method for photoelectrically scanning an object by means of an optical beam to detect the transition from non-illumination to illumination of unknown level, thereby generating a scanning signal whose amplitude is proportional to the instantaneous illumination, and to deliver a jump signal at a predetermined moment of the transition interval, characterized in that a prescanning is made by means of a second optical beam which precedes the scanning optical beam to generate an auxiliary signal of amplitude corresponding to full illumination, and further characterized in that the instant of the jump signal delivery is determined by coincidence of the scanning signal amplitude with a certain percentage of the held auxiliary signal amplitude, and further characterized in that the instant of the jump signal delivery is determined by coincidence of the scanning signal amplitude with the auxiliary signal amplitude which is multiplied by a coefficient 1.5 times higher than the coefficient multiplying the scanning signal amplitude.

2. A method as claimed in claim 1 for measuring the width of an object by means of processing the illumination jump at the edges thereof which define said width, the duration of a measuring pulse of which the edges are coincident with said illumination jumps being a measure for said width, characterized in that the pulse edge which is coincident with the illumination to non-illumination jump is generated at the instant of coincidence of the scanning signal amplitude with half the auxiliary signal amplitude, and in that the pulse edge which is coincident with the non-illumination to illumination jump is generated at the instant of coincidence of the scanning signal amplitude with 1.5 times the auxiliary signal amplitude.

3. A method as claimed in claim 1 for measuring the width of an object by means of processing the illumination jump at the edges thereof which define said width, the duration of a measuring pulse of which the edges are coincident with said illumination jumps being a measure for said width, characterized in that said pulse edges are generated at the coincidence terminations of the scanning and auxiliary signal amplitudes both multiplied by the same coefficient.

4. A device for photoelectrically scanning an object by means of an optical beam to detect the transition from non-illumination to illumination of unknown level, thereby generating a scanning signal whose amplitude is proportional to the instantaneous illumination, and to deliver a jump signal at a predetermined moment of the transition interval, said device comprising a photoelectric detector and a diaphragm system disposed in front thereof, and being characterized in that said diaphragm system comprises an auxiliary diaphragm aperture and a scanning diaphragm aperture for passing in time shifted succession one optical beam each to the detector, and further characterized in that means are provided for adjusting to equality the amplitudes of the signals successively delivered by the photoelectric detector illuminated by an optical beam passing through the auxiliary diaphragm aperture then through the scanning diaphragm aperture.

5. A device for photoelectrically scanning an object by means of an optical beam to detect the transition from non-illumination to illumination of unknown level, thereby generating a scanning signal whose amplitude is proportional to the instantaneous illumination, and to deliver a jump signal at a predetermined moment of the transition interval, said device comprising a photoelectric detector and a diaphragm system disposed in front thereof, and being characterized in that said diaphragm system comprises an auxiliary diaphragm aperture and a scanning diaphragm aperture for passing in time shifted succession one optical beam each to the detector, characterized in that the dimensions of the slot shaped diaphragm apertures are substantially identical, and further characterized in that the spacing of the two diaphragm apertures is chosen in such a manner that at the output of the detector the scanning and the auxiliary signal are superimposed thereby generating an amplitude step in the detector output signal corresponding to the full auxiliary signal amplitude and that the detector is coupled to circuitry means for delivering said jump signal at coincidence between said amplitude step—multiplied first constant factor—and the detector output signal amplitude—multiplied by a second constant factor.

6. A device as claimed in claim 5 wherein said circuitry means can produce said jump signal at the termination of coincidence between said amplitudes, and wherein said circuitry means further includes means for multiplying said amplitudes by the same coefficient.

7. A device as claimed in claim 5, wherein said circuitry means can produce said jump signal at the beginning of coincidence between said amplitudes, and wherein said circuitry means further includes means for producing a ratio of 1.5 between said first factor and said second factor, said means for producing comprising an amplifier set on the path followed by the amplitude step signal.

8. A device as claimed in claim 5 and wherein said circuitry means further includes an amplitude holding circuit for holding said amplitude step, a trigger circuit for switching on said amplitude holding circuit at a predetermined time after the beginning of said amplitude step, and an amplitude coincidence detector having to inputs which are respectively connected to the output of said photoelectric detector and of said amplitude holding circuit.

9. A device as claimed in claim 8, further including two coincidence detectors, wherein the inputs of the first coincidence detector are respectively connected to the output of the amplitude holding circuit and—via a 3:2 voltage divider—to the output of said photo detector, and wherein the inputs of the second coincidence detector are respectively connected to the output of the photo detector and—via a 2:1 voltage divider—to the output of said amplitude holding circuit, and wherein the outputs of both said coincidence detectors are respectively connected to control inputs of a bistable electronic switch, the signal corresponding to the width appearing at the output of the switch.

10. A method of detecting an object edge at which a jump in illumination level occurs, comprising the steps of:
prescanning the object with a prescanning optical beam crossing the edge of the object in a non-illumination/to illumination direction,
detecting the prescanning optical beam,
generating and holding an auxiliary signal having an amplitude corresponding to the maximum illumination of said prescanning optical beam,
scanning the object by means of a main optical beam crossing the edge of the object in a non-illumination to illumination direction while the auxiliary signal corresponding to maximum illumination of the prescanning beam is being held,
detecting the main scanning beam,
generating a scanning signal having an amplitude corresponding to a portion of the full illumination of said main beam,
comparing the two signals and delivering a coincidence signal when the amplitude of said scanning signal equals a predetermined percentage of the held amplitude of the auxiliary signal corresponding to maximum illumination of the prescanning beam, which coincidence signal indicates when the main scanning beam crosses said edge.

11. A method according to claim 10, wherein said main scanning beam crosses said edge while the prescanning beam is at maximum illumination, and the scanning signal corresponds to the sum of this maximum illumination of the prescanning beam and the instantaneous illumination of said main beam, and wherein the coincidence signal is delivered at the instant when said scanning signal is equal to 1.5 times the held amplitude of the auxiliary signal.

12. A method of measuring the width of an object between two edges at which a jump in the illumination level occurs, comprising:
prescanning the object by means of an optical beam so that this beam crosses one of the edges in the illumination to non-illumination direction and crosses the other edge in the non-illumination to illumination direction,
scanning the object by means of a main optical beam so that this latter beam also crosses the said one edge in the illumination to non-illumination direction and crosses the said other edge in the non-illumination to illumination direction,
providing a time shift between the prescanning and the scanning wherein
for the illumination to non-illumination transition, the prescanning beam falls to its non-illumination level while the main scanning beam is still at its maximum illumination level, thereby leaving a step in the sum of the illumination levels of the prescanning and main scanning beams, which step corresponds to the maximum illumination level of the main scanning beam,
and for the non-illumination to illumination transition, the main scanning beam rises to its maximum illumination level while the prescanning beam is at its maximum illumination level, thereby leaving a step in the sum of the illumination levels of the prescanning and main scanning beams, which step corresponds to the maximum illumination level of the prescanning beam;
and detecting the sum of the illuminations of the prescanning and main scanning beams and generating a signal whose amplitude corresponds to said sum, said signal then containing a step of amplitude A corresponding to the maximum illumination level of the main scanning beam and a step of amplitude B corresponding to the maximum illumination level of the prescanning beam;
and comparing the amplitude of said sum signal with the step amplitudes A and B and delivering a coincidence signal at the instant when said sum signal amplitudes coincides with 0.5A and delivering another coincidence signal at the instant when said sum signal amplitude coincides with 1.5B, the time interval between these two coincidence signals then representing the width between said two edges.

13. A method for photoelectrically scanning an object by means of optical beams to detect the edge of the object, which edge is at the transition from non-illumination to illumination of an unknown level comprising the steps of:
prescanning the edge with an auxiliary optical beam;
generating an auxiliary scanning signal from said auxiliary optical beam having an amplitude corresponding to full illumination and holding the value of the signal;
scanning the edge with a main optical beam;
generating a main scanning signal from the main optical beam, the amplitude of the main scanning signal being proportional to the full illumination;
producing a step signal on coincidence of the main scanning signal amplitude with a level equal to a predetermined percentage of the held auxiliary signal amplitude to indicate the detection of the edge of an object.

14. A device for photoelectrically scanning an object to detect an edge of said object comprising:
a photoelectric detector;
means for generating a prescanning and a scanning beam;
means for directing said beams to said photoelectric detector in a timed sequence; and
means for receiving the electrical output of said photoelectric detector and for delivering a signal when the amplitude of said scanning beam is a predetermined percentage of the amplitude of said prescanning beam to indicate when the scanning beam has detected the edge of said object.

15. A device for photoelectrically scanning an object to detect an edge of said object comprising:
a light source positioned on one side of said object;
a photoelectric detector located on the other side of said object;
optical means for generating a prescanning beam and a scanning beam from said light source and for sequentially directing said beams to said detector;
aperture means disposed in front of said detector for passing each of said beams to said detector in a timed sequence; and
means coupled to said detector for receiving the output thereof and for producing a signal when the amplitude of said scanning beam is a predetermined percentage of prescanning beam.

16. A device according to claim 15 wherein said aperture means includes two substantially identical apertures.

17. A device according to claim 16 wherein said optical means includes a rotating mirror positioned on said other side of said object and a focusing means located between said rotating mirror and said object for focusing the light from said light source onto said rotating mirror.

18. A device for measuring the width of an object by photoelectrically scanning said object to determine the separation of the first and second edges of said object comprising:
a light source positioned on one side of said object;
a photoelectric detector positioned on another side of said object;
means for generating a prescanning beam and a scanning beam corresponding to each edge of said object;
a diaphragm aperture means positioned in front of said photoelectric detector for directing said beams in a timed sequence to said photoelectric detector;
means coupled to said photoelectric detector for producing a first signal when the amplitude of said scanning beam crossing the first edge corresponds to a predetermined percentage of the amplitude of the prescanning beam crossing said first edge and a second signal when the amplitude of said scanning beam crossing the second edge corresponds to a predetermined percentage of the amplitude of the prescanning beam crossing said second edge; and
means for timing the duration between said first signal and said second signal for detecting the width of said object.

* * * * *